(12) United States Patent
Yu et al.

(10) Patent No.: US 11,828,456 B1
(45) Date of Patent: Nov. 28, 2023

(54) LIGHT SOURCE MODULE

(71) Applicant: Qisda Corporation, Taoyuan (TW)

(72) Inventors: Pin-Feng Yu, Taoyuan (TW); Jyun-Sheng Syu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/179,370

(22) Filed: Mar. 7, 2023

(30) Foreign Application Priority Data

Jun. 16, 2022 (CN) .......................... 202210688030.0

(51) Int. Cl.
| F21V 7/05 | (2006.01) |
| F21V 9/40 | (2018.01) |
| F21V 5/00 | (2018.01) |
| F21V 15/01 | (2006.01) |
| F21Y 115/10 | (2016.01) |
| F21Y 105/10 | (2016.01) |

(52) U.S. Cl.
CPC ................. *F21V 7/05* (2013.01); *F21V 5/00* (2013.01); *F21V 9/40* (2018.02); *F21V 15/01* (2013.01); *F21Y 2105/10* (2016.08); *F21Y 2115/10* (2016.08)

(58) Field of Classification Search
CPC ..... F21V 5/00; F21V 7/05; F21V 9/40; F21V 15/01
See application file for complete search history.

(56) References Cited

U.S. PATENT DOCUMENTS

2017/0017121 A1* 1/2017 Park .................. G02F 1/133609
2019/0027099 A1* 1/2019 Kumar .................. F21V 23/045

* cited by examiner

Primary Examiner — Evan P Dzierzynski
Assistant Examiner — Nathaniel J Lee

(57) ABSTRACT

A light source module includes a backplane, a light source, a reflective layer, a color conversion layer, and at least one optical film. The backplane has a first bottom surface, a first sidewall surface, a second bottom surface, and a second sidewall surface. The first sidewall surface is connected between the first bottom surface and the second bottom surface. The second bottom surface is higher than the first bottom surface and connected between the first sidewall surface and the second sidewall surface. The light source is disposed on the first bottom surface. The reflective layer is disposed on the second bottom surface and the second sidewall surface. The color conversion layer is disposed on the reflective layer. The at least one optical film is placed on the second bottom surface. The reflective layer and the color conversion layer are located between the at least one optical film and the backplane.

15 Claims, 2 Drawing Sheets

LIGHT SOURCE MODULE

CROSS-REFERENCE TO RELATED APPLICATION

This application claims the priority benefit of China application serial no. 202210688030.0, filed on Jun. 16, 2022. The entirety of the above-mentioned patent application is hereby incorporated by reference herein and made a part of this specification.

BACKGROUND OF THE INVENTION

Field of the Invention

The disclosure relates to a module, and more particularly, to a light source module.

Description of Related Art

In a general direct-type backlight module, optical films (such as a color conversion sheet, a diffusion sheet, etc.) are disposed on the backplane and overlapped with the blue light-emitting diode. Under this architecture, a small portion of the blue light emitted by the blue light-emitting diode is emitted from the surrounding of the direct-type backlight module via the gaps between the optical films and the backplane, and is not excited/converted by the color conversion film. As a result, the surrounding color of the direct-type backlight module is bluish or dark.

SUMMARY OF THE INVENTION

The disclosure provides a light source module that may alleviate the issue of bluish or dark colors around the module.

According to an embodiment of the disclosure, a light source module includes a backplane, a light source, a reflective layer, a color conversion layer, and at least one optical film. The backplane has a first bottom surface, a first sidewall surface, a second bottom surface, and a second sidewall surface. The first sidewall surface is connected between the first bottom surface and the second bottom surface. The second bottom surface is higher than the first bottom surface and connected between the first sidewall surface and the second sidewall surface. The light source is disposed on the first bottom surface. The reflective layer is disposed on the second bottom surface and the second sidewall surface. The color conversion layer is disposed on the reflective layer. The at least one optical film is placed on the second bottom surface. The reflective layer and the color conversion layer are located between the at least one optical film and the backplane.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
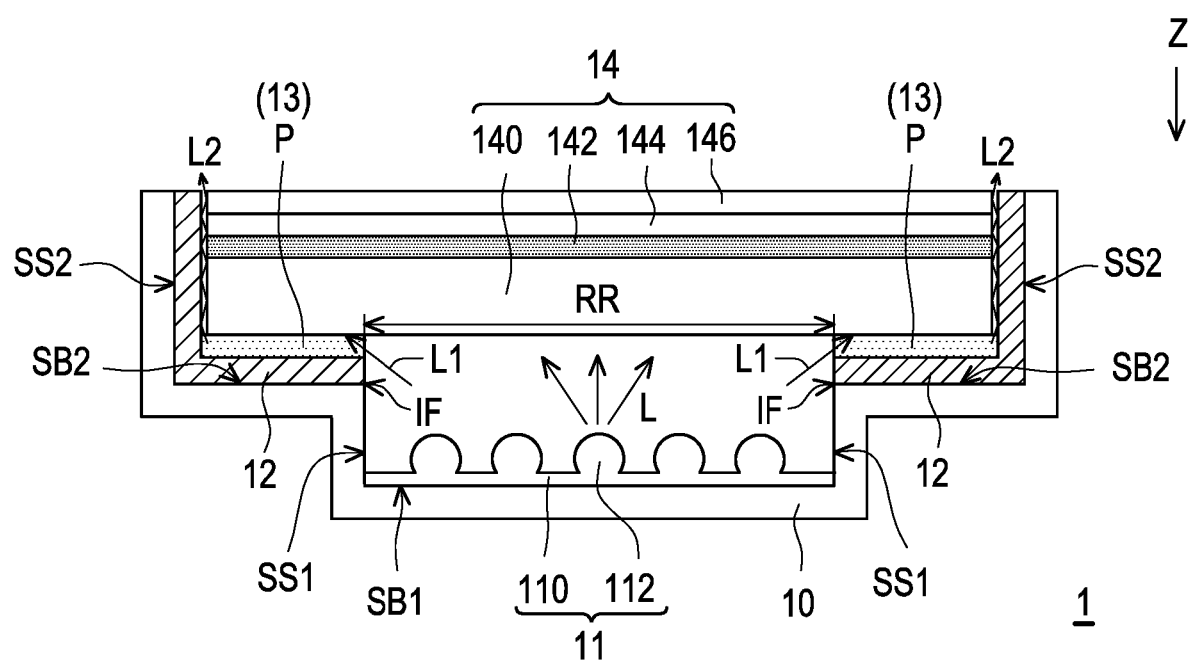
FIG. 1 to FIG. 4 are schematic cross-sectional views of light source modules according to a plurality of embodiments of the disclosure.

In the present specification, wordings used to indicate direction, such as "up," "down," "front," "back," "left," and "right", merely refer to directions in the drawings. Therefore, the directional terms are used to illustrate and are not intended to limit the disclosure.

In the drawings, the figures depict typical features of the methods, structures, or materials used in the particular embodiments. However, the figures are not to be interpreted as defining or limiting the scope or nature of the embodiments. For example, the relative size, thickness, and location of layers, regions, or structures may be reduced or enlarged for clarity.

Terms such as "first" and "second" as used in this specification or the claims are used to identify different elements or to distinguish different embodiments or ranges, and are not intended to limit the upper limit or the lower limit of the number of elements and are also not intended to limit the order of manufacture of the elements or the order in which the elements are arranged. Furthermore, the disposition/placement of one element/layer on (or above) another element/layer may include the case in which the element/layer is disposed/placed directly on (or above) the other element/layer, and two elements/layers are in direct contact; and the case in which the element/layer is disposed/placed indirectly on (or above) the other element/layer and one or a plurality of elements/layers are present between the two elements/layers.

FIG. 1 to FIG. 4 are schematic cross-sectional views of light source modules according to a plurality of embodiments of the disclosure. In the embodiments shown in FIG. 1 to FIG. 4, the same or similar elements are designated by the same or similar reference numerals, and the description thereof is omitted. In addition, the features in different embodiments may be combined with each other without conflict, and the simple equivalent changes and modifications made by the present specification or the claims are still within the scope of this patent.

Referring to FIG. 1, a light source module 1 may include a backplane 10, a light source 11, a reflective layer 12, a color conversion layer 13, and at least one optical film 14, but not limited thereto. According to different requirements, the light source module 1 may further include one or a plurality of elements or film layers.

The backplane 10 may accommodate the light source 11 and support the reflective layer 12, the color conversion layer 13, and the at least one optical film 14. For example, the backplane 10 may include an iron member or other sheet materials with stiffness or support, but not limited thereto.

The backplane 10 has, for example, a first bottom surface SB1, a first sidewall surface SS1, a second bottom surface SB2, and a second sidewall surface SS2. Taking FIG. 1 as an example, the first bottom surface SB1 and the second bottom surface SB2 are, for example, horizontal planes, and the first sidewall surface SS1 and the second sidewall surface SS2 are, for example, vertical planes perpendicular to the horizontal plane, but not limited thereto. According to different requirements, the first sidewall surface SS1 and the second sidewall surface SS2 may be not perpendicular and not parallel to the first bottom surface SB1 and the second bottom surface SB2. For example, the first sidewall surface SS1 may be extended obliquely from the first bottom surface SB1 to the second bottom surface SB2, but not limited thereto.

The first sidewall surface SS1 is connected between the first bottom surface SB1 and the second bottom surface SB2, and the first sidewall surface SS1 surrounds the first bottom surface SB1 to enclose a space for accommodating the light source 11.

The second bottom surface SB2 is higher than the first bottom surface SB1 to provide a surface to support the at least one optical film 14. Moreover, the second bottom surface SB2 is connected between the first sidewall surface SS1 and the second sidewall surface SS2, and the second sidewall surface SS2 surrounds the second bottom surface SB2 to enclose a space for accommodating the at least one optical film 14.

The light source 11 is disposed on the first bottom surface SB1 and used to provide an illumination light L. For example, the light source 11 may include a circuit board 110 and a light-emitting element 112, but not limited thereto. The circuit board 110 may include, but is not limited to, a printed circuit board or a flexible printed circuit board, but not limited thereto. The light-emitting element 112 is disposed on the circuit board 110 and electrically connected to the circuit board 110. The light-emitting element 112 may include a light-emitting diode, but not limited thereto.

In some embodiments, the light source 11 may include a plurality of light-emitting elements 112, and the plurality of light-emitting elements 112 may include at least one of a blue light-emitting element, a red light-emitting element, and a green light-emitting element. For example, the plurality of light-emitting elements 112 may include a plurality of blue light-emitting elements; or, the plurality of light-emitting elements 112 may include a plurality of blue light-emitting elements and a plurality of green light-emitting elements; or, the plurality of light-emitting elements 112 may include a plurality of blue light-emitting elements and a plurality of red light-emitting elements; or, the plurality of light-emitting elements 112 may include a plurality of blue light-emitting elements, a plurality of red light-emitting elements, and a plurality of green light-emitting elements, but not limited thereto.

The reflective layer 12 is disposed on the second bottom surface SB2 and the second sidewall surface SS2 to improve light reflection efficiency. For example, the reflective layer 12 may include a matte reflective sheet, a glossy reflective sheet, a reflective adhesive layer (such as white paint or high reflective adhesive, etc.) or any film layer having a reflective effect. Moreover, the reflective layer 12 may be formed on the second bottom surface SB2 and the second sidewall surface SS2 by attaching, printing, or other feasible methods. In some embodiments, the reflective layer 12 may completely cover the second bottom surface SB2 and the second sidewall surface SS2, but not limited thereto. For example, although not shown, the reflective layer 12 may partially cover the second bottom surface SB2 and/or the second sidewall surface SS2.

The color conversion layer 13 is disposed on the reflective layer 12 to convert the illumination light L into other color light (hereinafter referred to as converted light). For example, the material of the color conversion layer 13 may include fluorescence, phosphorescence, quantum dot (QD), or a combination thereof, but not limited thereto. In some embodiments, the illumination light L may include blue light, and the material of the color conversion layer 13 may include at least one of a yellow conversion material, a red conversion material, and a green conversion material, but not limited thereto. The yellow conversion material may, for example, convert blue light into yellow light (i.e., convert light to yellow light), the red conversion material, for example, may convert blue light into red light (i.e., convert light into red light), and the green conversion material may, for example, convert blue light into green light (i.e., convert light into green light).

In some embodiments, the color conversion layer 13 may include a yellow conversion material, and yellow light (converted light) formed by the action (conversion/excitation) of the yellow conversion material and blue light (the illumination light L) without the action of the yellow conversion material may be mixed into white light. In some other embodiments, the color conversion layer 13 may include a red conversion material and a green conversion material, and the red light and the green light (converted light) formed by the action (conversion/excitation) of the red conversion material and the green conversion material and the blue light (the illumination light L) without the action of the red conversion material and the green conversion material may be mixed into white light. In still some embodiments, the color conversion layer 13 may include a yellow conversion material, a red conversion material, and a green conversion material, and yellow light, red light, and green light (converted light) formed by the action (conversion/excitation) of the yellow conversion material, the red conversion material, and the green conversion material and blue light (the illumination light L) without the action of the yellow conversion material, the red conversion material, and the green conversion material may be mixed into white light.

In some embodiments, the color conversion layer 13 may be directly disposed on the reflective layer 12 by coating or printing, but not limited thereto. In some other embodiments, the color conversion layer 13 may be attached on the reflective layer 12, that is, an adhesive material (not shown) may exist between the color conversion layer 13 and the reflective layer 12.

In some embodiments, the color conversion layer 13 may cover only one of the second bottom surface SB2 and the second sidewall surface SS2. For example, the color conversion layer 13 may cover the second bottom surface SB2 and not cover the second sidewall surface SS2 (as shown in FIG. 1). Alternatively, although not shown in FIG. 1, the color conversion layer 13 may cover the second sidewall surface SS2 and not cover the second bottom surface SB2, but not limited thereto. In other embodiments, although not shown in FIG. 1, the color conversion layer 13 may cover the second bottom surface SB2 and the second sidewall surface SS2.

In some embodiments, the color conversion layer 13 may include one or a plurality of stripe patterns P (only one is schematically shown in FIG. 1). For example, the stripe pattern P may be extended along the extending direction (e.g., the direction perpendicular to the paper surface) of a boundary IF between the second bottom surface SB2 and the first side wall surface SS1. In other embodiments, although not shown, the color conversion layer 13 may include a plurality of dot patterns (or block patterns) or spatially gradient patterns. The spatially gradient patterns may include, for example, that the distribution density of a plurality of color conversion patterns is changed (e.g., becomes greater or less) as the distance from the center of the light source module 1 is increased.

The at least one optical film 14 is placed on the second bottom surface SB2, and the reflective layer 12 and the color conversion layer 13 are located between the at least one optical film 14 and the backplane 10. Taking FIG. 1 as an example, under the architecture under which the color conversion layer 13 covers the second bottom surface SB2, the at least one optical film 14 may be directly disposed on the color conversion layer 13, but not limited thereto.

The at least one optical film 14 and the light source 11 have an overlapping region RR, and the color conversion layer 13 is located outside the overlapping region RR. That is, the color conversion layer 13 and the overlapping region RR are not overlapped in a top view direction Z of the light source module 1. The design that the color conversion layer 13 is located outside the overlapping region RR may reduce the adverse effect of the heat generated by the light source 11 on the color conversion layer 13 or reduce the possibility of damage (e.g., scratches) to the color conversion layer 13.

In some embodiments, the at least one optical film 14 may include a diffusion sheet 140 to improve the uniformity of output light. For example, the diffusion sheet 140 may be placed on the second bottom surface SB2 and be in contact with the color conversion layer 13.

In some embodiments, the at least one optical film 14 may further include a color conversion sheet 142 to convert the illumination light L passing through the diffusion sheet 140 into other color light. For example, the color conversion sheet 142 may be placed on the diffusion sheet 140, and the color conversion sheet 142 and the color conversion layer 13 are respectively located at opposite sides (e.g., upper and lower sides) of the diffusion sheet 140, but not limited thereto. For example, when the color conversion layer 13 covers the second sidewall surface SS2 and does not cover the second bottom surface SB2, the color conversion sheet 142 and the color conversion layer 13 are, for example, located at two adjacent sides of the diffusion sheet 140, respectively; or, when the color conversion layer 13 covers the second bottom surface SB2 and the second sidewall surface SS2, the color conversion sheet 142 and the color conversion layer 13 are, for example, located at three adjacent sides of the diffusion sheet 140, respectively.

The material of the color conversion plate 142 may include fluorescence, phosphorescence, quantum dots, or a combination thereof, but not limited thereto. In some embodiments, the illumination light L may include blue light, and the material of the color conversion sheet 142 may include at least one of a yellow conversion material, a red conversion material, and a green conversion material, but not limited thereto.

In some embodiments, the color conversion sheet 142 may fully cover the diffusion sheet 140. Compared with the color conversion layer 13 not overlapped with the overlapping region RR in the top view direction Z of the light source module 1, when viewed from the top view direction Z of the light source module 1, the orthographic projection area of the color conversion sheet 142 on the diffusion sheet 140 is greater than the orthographic projection area of the color conversion layer 13 on the diffusion sheet 140.

In some embodiments, the at least one optical film 14 may further include an optical film 144 and an optical film 146. The optical film 144 and the optical film 146 are disposed on the color conversion sheet 142 in sequence, and the optical film 144 and the optical film 146 are selected from, for example, two of a prism sheet, a diffusion sheet, and a reflective brightness enhancement film, but not limited thereto. In other embodiments, although not shown, the number of films in the at least one optical film 14 may be increased or decreased according to different requirements. The following embodiments may be changed in the same way, which is not repeated herein.

In FIG. 1, the light source module 1 is, for example, a direct-type light source module, wherein the light source 11 and the at least one optical film 14 are disposed in an overlapping manner, and the light guide plate may be omitted from the light source module 1. The space for accommodating the light source 11 and the space for supporting the at least one optical film 14 may be formed via the design of the double bottom surface and the double sidewall surface of the backplane 10. By disposing the color conversion layer 13 between the backplane 10 and the at least one optical film 14, at least a portion of the illumination light L1 (such as blue light) transmitted between the backplane 10 and the at least one optical film 14 may be converted into converted light (such as yellow light), so that a light L2 emitted from the surrounding of the light source module 1 includes the white light formed by mixing the converted light and the illumination light L1 without the action of the color conversion layer 13, thereby alleviating the issue of bluish color around the module. Moreover, by disposing the reflective layer 12 between the color conversion layer 13 and the backplane 10, the issue of light absorption by the backplane 10 or poor light utilization may be alleviated, thus helping to improve the reflection efficiency of light, so that more of the light L2 may be emitted from around the module, and thereby alleviating the issue of dark color or insufficient brightness around the module.

Although the light source module in FIG. 1 is illustrated as a direct-type light source module, it should be understood that the light source module of any embodiment of the disclosure is not intended to exclude edge-type light source modules. For example, although not shown, the light source 11 may also include a light guide plate and a plurality of light-emitting elements disposed at a side of the light guide plate. The following embodiments may be changed in the same way, which is not repeated herein.

In addition, although not shown in FIG. 1, a reflective layer may be formed on the first sidewall surface SS1 or the first sidewall surface SS1 may be polished to improve light utilization. The following embodiments may be changed in the same way, which is not repeated herein.

Figure 2:
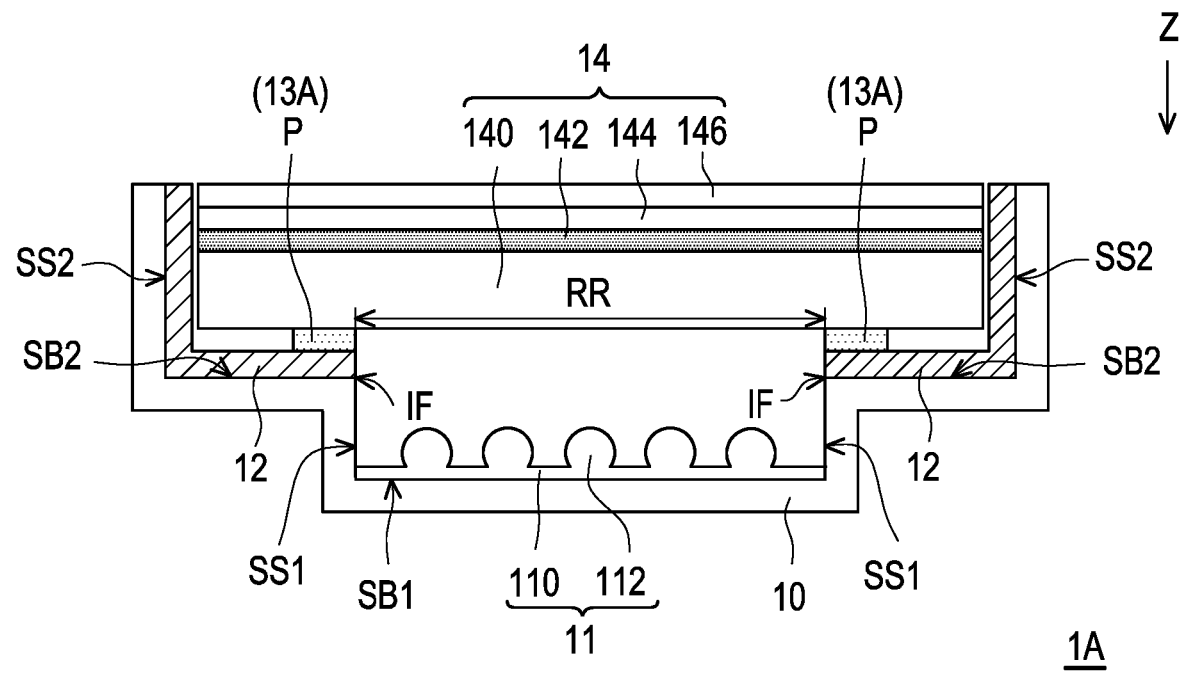

Referring to FIG. 2, in a light source module 1A, the stripe pattern P of a color conversion layer 13A, for example, partially covers the second bottom surface SB2 and is disposed adjacent to the boundary IF between the second bottom surface SB2 and the first sidewall surface SS1. However, it should be understood that, although not shown, the shape, location, or cover range of the stripe pattern P of the color conversion layer 13A may be changed according to different requirements. For example, the stripe pattern P of the color conversion layer 13A may be disposed away from the boundary IF between the second bottom surface SB2 and the first sidewall surface SS1; or, the stripe pattern P of the color conversion layer 13A may partially cover the second sidewall surface SS2, but not limited thereto.

Via the above design, in addition to alleviating the issue of bluish or dark colors around the module, the cost or time for manufacturing the color conversion layer may also be reduced.

Figure 3:
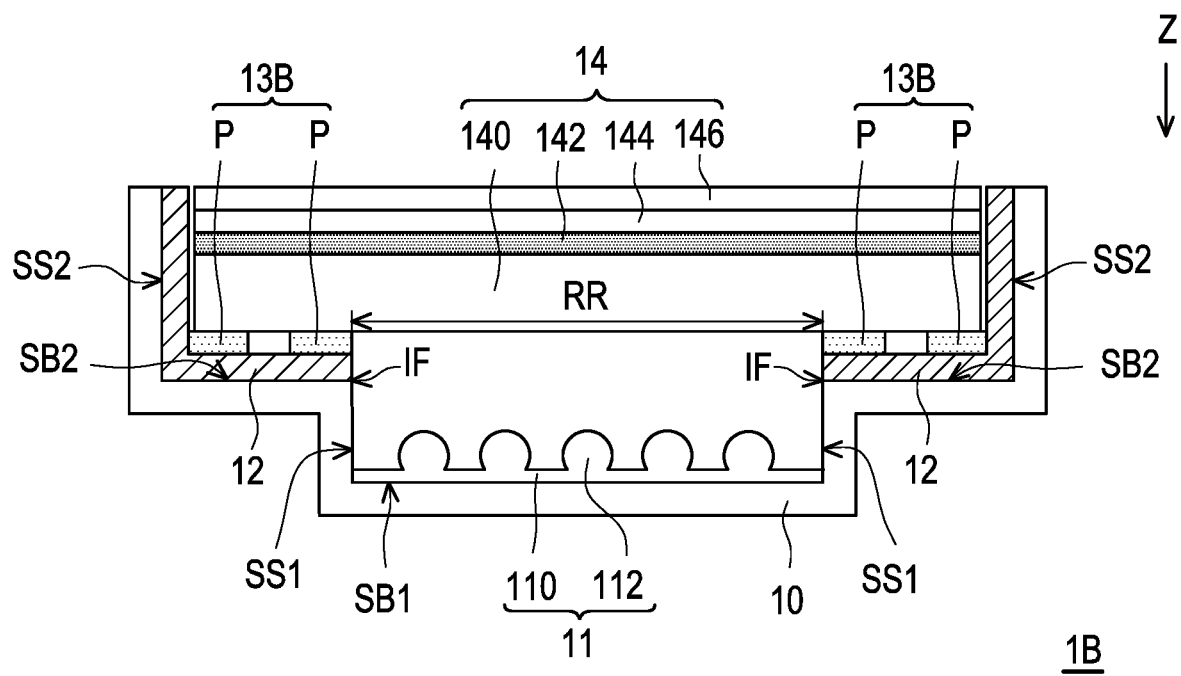

Referring to FIG. 3, in a light source module 1B, the color conversion layer 13B includes a plurality of stripe patterns P. For example, the plurality of stripe patterns P partially cover the second bottom surface SB2 and are arranged in a direction away from the boundary IF between the second bottom surface SB2 and the first sidewall surface SS1. However, it should be understood that, although not shown, the number, shape, location, or cover range of the plurality of strip patterns P of the color conversion layer 13B may be changed according to different requirements. For example, the number of the stripe patterns P of the color conversion layer 13B may be greater than 2; or, the plurality of stripe patterns P of the color conversion layer 13B may be respectively disposed on the second bottom surface SB2 and the second sidewall surface SS2; or, the plurality of stripe patterns P of the color conversion layer 13B may be disposed on the second sidewall surface SS2, but not limited thereto.

Via the above design, in addition to alleviating the issue of bluish or dark colors around the module, the cost or time for manufacturing the color conversion layer may also be reduced, and light conversion rate may be improved.

Figure 4:
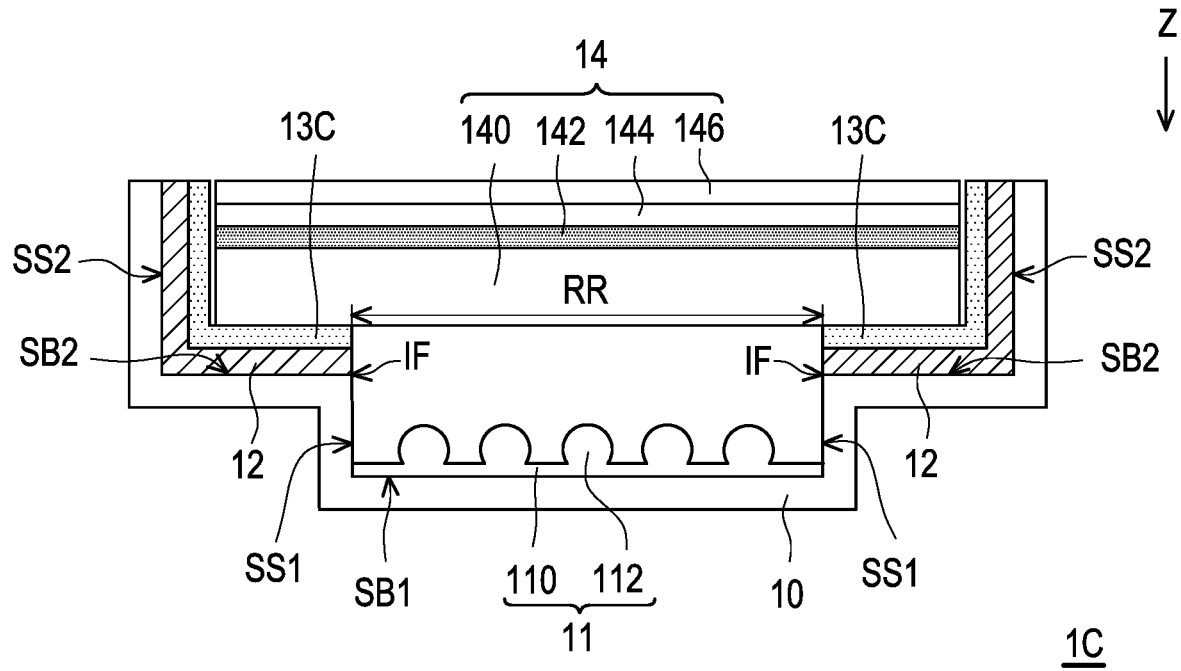

Referring to FIG. 4, in a light source module 1C, a color conversion layer 13C, for example, completely covers the second bottom surface SB2 and the second sidewall surface SS2, so that the at least one optical film 14 is surrounded by the color conversion layer 13C.

Via the above design, in addition to alleviating the issue of bluish or dark colors around the module, light conversion rate may also be improved.

Based on the above, in an embodiment of the disclosure, the space for accommodating the light source and the space for supporting the at least one optical film may be formed via the design of the double bottom surface and the double sidewall surface of the backplane. By disposing the color conversion layer between the backplane and the at least one optical film, at least a portion of the illumination light transmitted between the backplane and the at least one optical film may be converted into converted light, so that light emitted from the surrounding of the light source module includes the white light formed by mixing the converted light and the illumination light without the action of the color conversion layer, thereby alleviating the issue of bluish color around the module. Moreover, by disposing the reflective layer between the color conversion layer and the backplane, the issue of poor light absorption or light utilization by the backplane may be alleviated, thus helping to improve the reflection efficiency of light, so that more of the light may be emitted from around the module, and thereby alleviating the issue of dark color or insufficient brightness around the module.

Although the disclosure has been described with reference to the above embodiments, it will be apparent to one of the ordinary skill in the art that modifications and variations to the described embodiments may be made without departing from the spirit and scope of the disclosure. Accordingly, the scope of the disclosure will be defined by the attached claims not by the above detailed descriptions.

What is claimed is:

1. A light source module, comprising:
    a backplane having a first bottom surface, a first sidewall surface, a second bottom surface, and a second sidewall surface, wherein the first sidewall surface is connected between the first bottom surface and the second bottom surface, and the second bottom surface is higher than the first bottom surface and connected between the first sidewall surface and the second sidewall surface;
    a light source disposed on the first bottom surface;
    a reflective layer disposed on the second bottom surface and the second sidewall surface;
    a color conversion layer disposed on the reflective layer; and
    at least one optical film placed on the second bottom surface, and the reflective layer and the color conversion layer are located between the at least one optical film and the backplane.

2. The light source module of claim 1, wherein the color conversion layer is directly disposed on the reflective layer.

3. The light source module of claim 1, wherein the color conversion layer is attached on the reflective layer.

4. The light source module of claim 1, wherein the color conversion layer covers only one of the second bottom surface and the second sidewall surface.

5. The light source module of claim 1, wherein the color conversion layer covers the second bottom surface and the second sidewall surface.

6. The light source module of claim 1, wherein the color conversion layer comprises one or a plurality of stripe patterns, and the one or plurality of stripe patterns are extended along an extending direction of a boundary between the second bottom surface and the first sidewall surface.

7. The light source module of claim 1, wherein a material of the color conversion layer comprises at least one of a yellow conversion material, a red conversion material, and a green conversion material.

8. The light source module of claim 1, wherein the light source comprises at least one of a blue light-emitting element, a red light-emitting element, and a green light-emitting element.

9. The light source module of claim 1, wherein the reflective layer comprises a matte reflective sheet, a glossy reflective sheet, or a reflective adhesive layer.

10. The light source module of claim 1, wherein the at least one optical film and the light source have an overlapping region, and the color conversion layer is located outside the overlapping region.

11. The light source module of claim 1, wherein the at least one optical film comprises:
    a diffusion sheet placed on the second bottom surface and in contact with the color conversion layer.

12. The light source module of claim 11, wherein the at least one optical film further comprises:
    a color conversion sheet placed on the diffusion sheet, and the color conversion sheet and the color conversion layer are respectively located at opposite sides of the diffusion sheet.

13. The light source module of claim 12, wherein viewed from a top view direction of the light source module, an orthographic projection area of the color conversion sheet on the diffusion sheet is greater than an orthographic projection area of the color conversion layer on the diffusion sheet.

14. The light source module of claim 12, wherein a material of the color conversion sheet comprises at least one of a yellow conversion material, a red conversion material, and a green conversion material.

15. The light source module of claim 12, wherein the at least one optical film further comprises:
    at least one of a prism sheet, another diffusion sheet, and a reflective brightness enhancement film disposed on the color conversion film.

* * * * *